March 31, 1964  D. G. LYON  3,127,130
VARIABLE SHAPED AIRFOIL
Filed Feb. 26, 1962  5 Sheets-Sheet 5
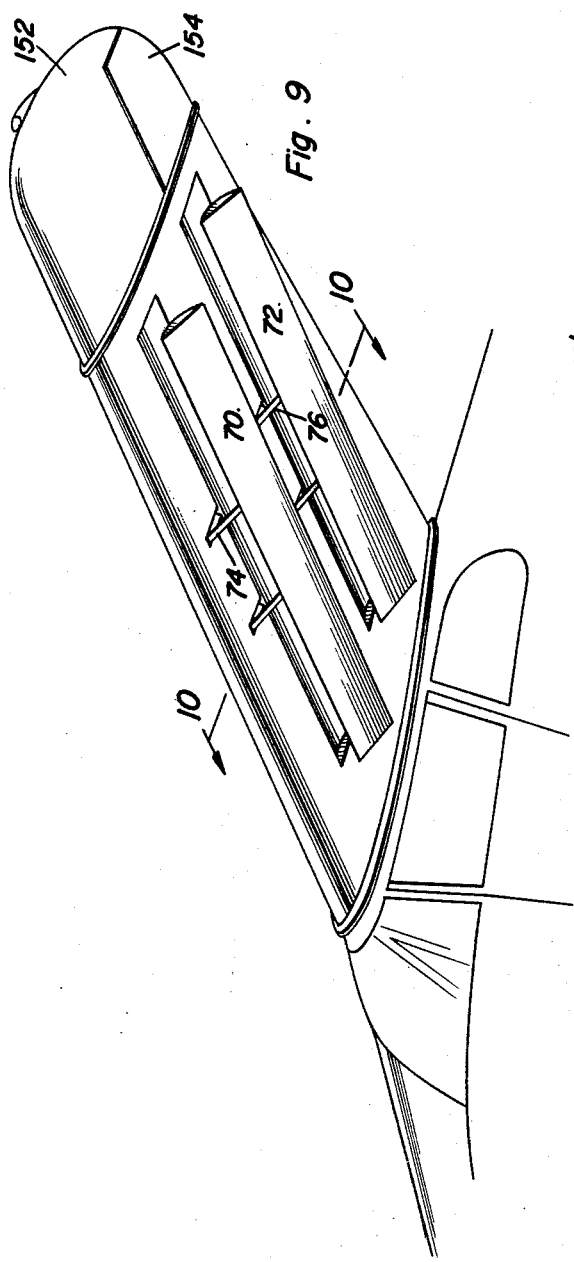
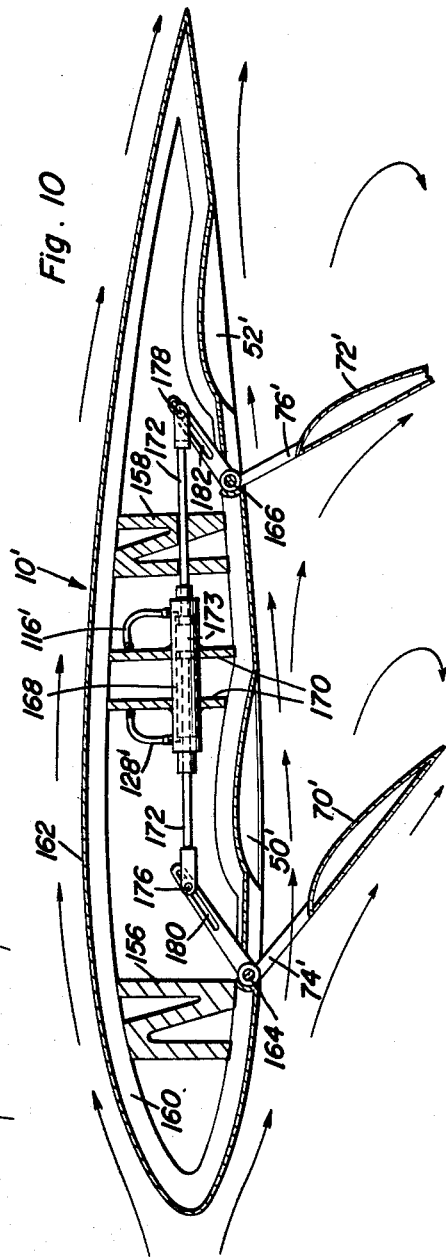
Donald G. Lyon
INVENTOR.

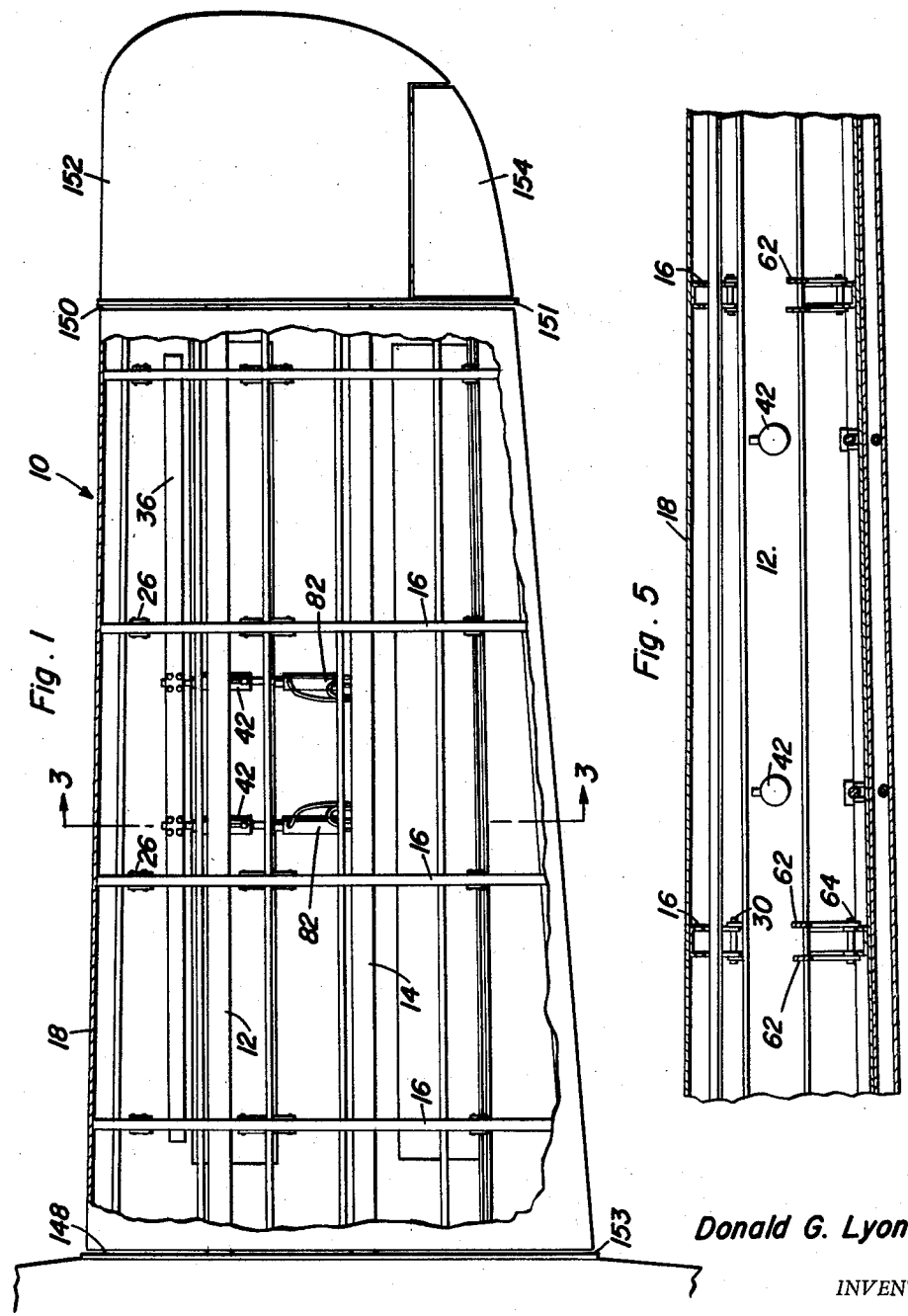

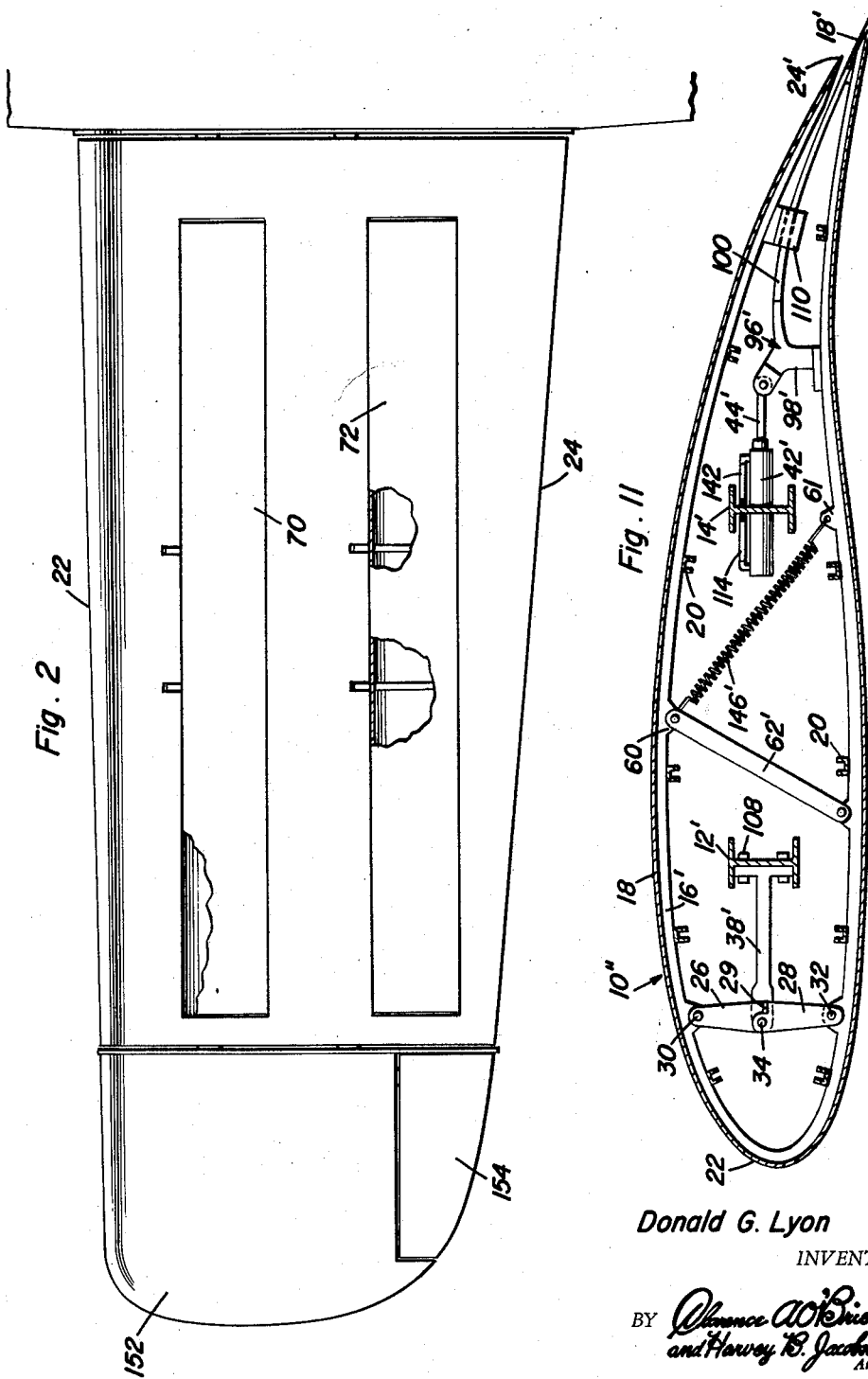
Donald G. Lyon
INVENTOR.

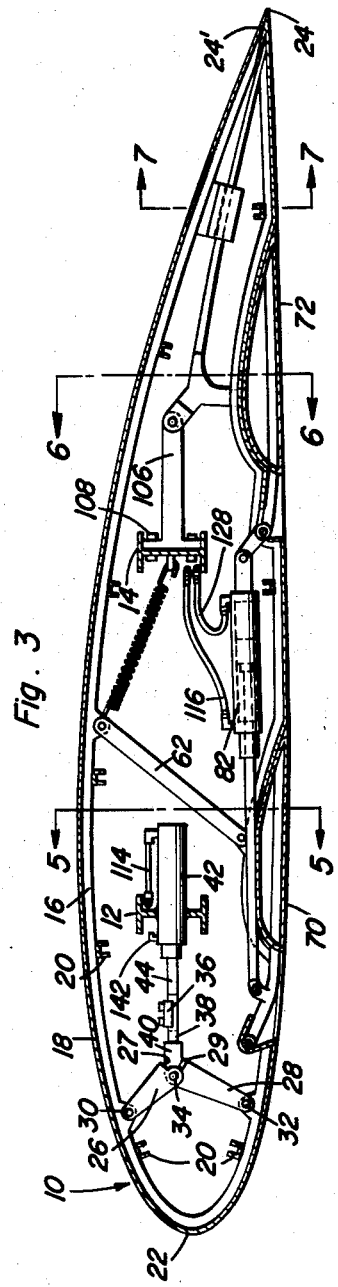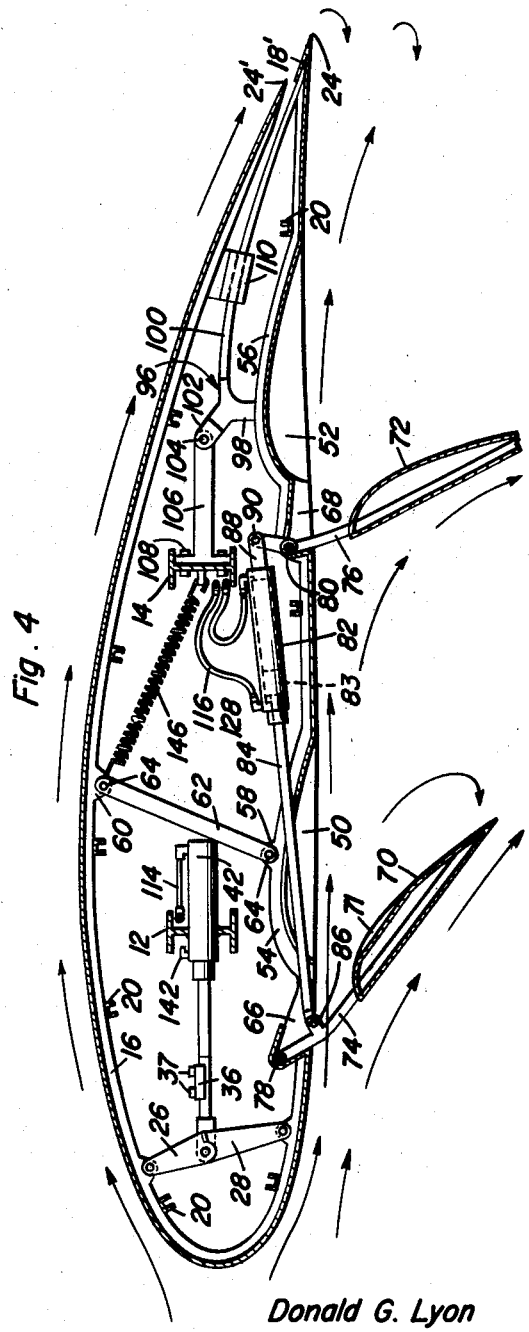
Donald G. Lyon
INVENTOR.

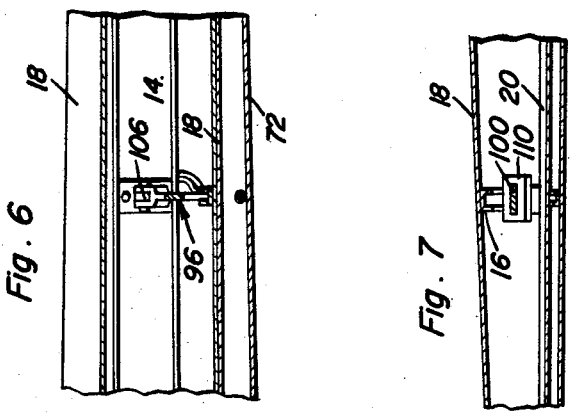
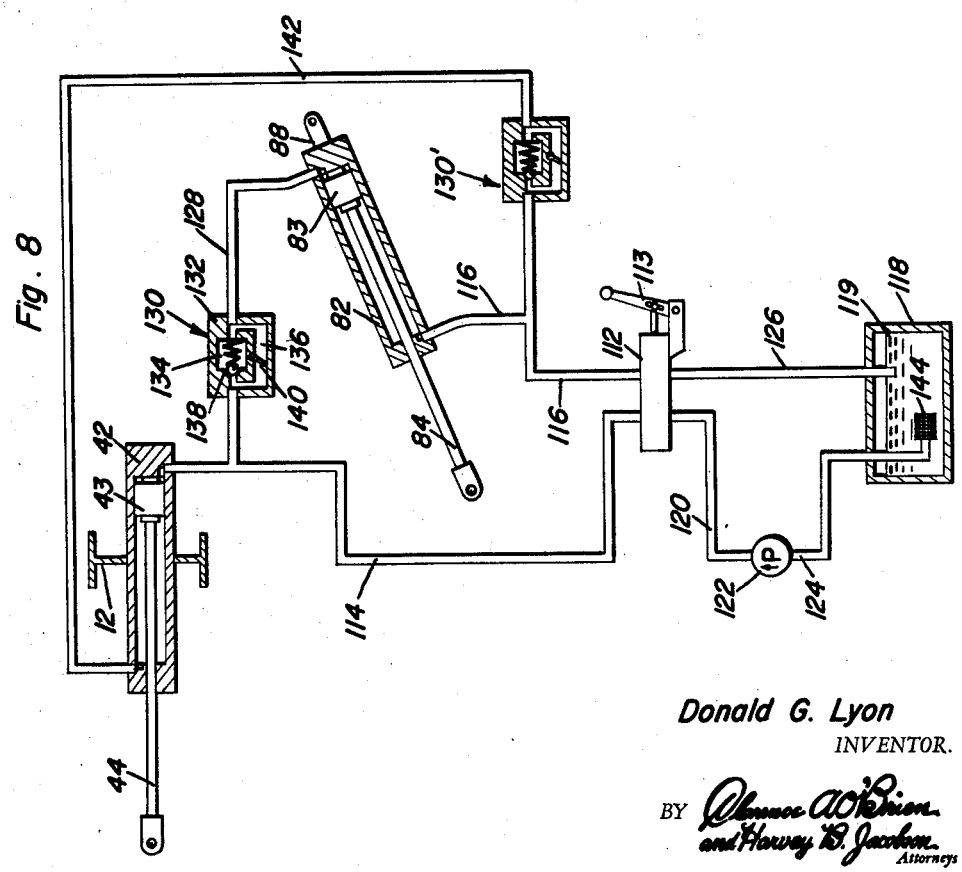
Donald G. Lyon
INVENTOR.

United States Patent Office 3,127,130
Patented Mar. 31, 1964

3,127,130
VARIABLE SHAPED AIRFOIL
Donald G. Lyon, Dubuque, Iowa
(701 Avon Place, Alexandria, Va.)
Filed Feb. 26, 1962, Ser. No. 176,181
18 Claims. (Cl. 244—44)

This invention relates to aircraft wing structures, and more particularly to wing structures having movable parts for controlling and changing the aerodynamic characteristics thereof.

It is a primary object of this invention to provide a wing or airfoil structure which is flexible and whose cross-sectional shape is power operated so that it may be controlled by the pilot or other personnel in the aircraft, and the wing is also provided with novel flap means remotely controlled also by the aircraft personnel for further modifying or changing the aerodynamic characteristics of the wing as desired.

It is still another object of my invention to provide an improved wing flap design which is not only particularly adapted for use in flexible wings, but may also be used to advantage in conventional wings as a surface control element.

A conventional flapped wing has the inherent quality of increasing the moment of pitch of the wing. In other words, it tends to cause the nose of the aircraft to pitch downwardly, and this is ordinarily overcome by elevator control. Accordingly, it is a primary object of my invention to provide a new type of flap which will not change the pitching characteristics or moment of pitch of an aircraft when in operation.

In a conventional aircraft, the flaps are located near the trailing edge of the wing of the aircraft, and this causes the center of lift of the aircraft wing to move rearwardly when the flaps are in operation. This rearward shift of the center of lift is what causes the above described changes in pitching moment of the aircraft. By providing flaps at the forward portion of the aircraft's wings, as well as providing flaps at the rear edge thereof, I thereby produce an improved flapped wing whose center of lift remains substantially stationary whether or not the flaps are in operation and thereby eliminating any changes in pitching characteristics of the aircraft.

It is yet another object of my invention to provide an aircraft wing having a plurality of longitudinally extending flaps spaced chordwise from one another whereby the forwardmost flaps when extended are substantially spaced from the bottom surface of the wing thereby permitting a substantial volume of air to flow between this forward flap and the lower wing surface for reacting upon the rear flaps. This particular arrangement prevents the forward flaps from blocking flow of air to the rear flaps thereby permitting the flaps to operate at maximum efficiency for producing the optimum of lift. Also, the forward flaps assist in leveling out gusts and turbulent air thereby enabling the rear flaps to maintain a smoother and better controlled airflow over the top and rear sections of the main airfoil. This arrangement and configuration of the flaps in relation to the wing will greatly increase the wing's lifting ability as well as its lifting reliabiltiy.

It is another object of the invention to provide a power control system for changing the thickness of a flexible wing and controlling the flaps thereof which is so designed that the wings must be expanded to maximum thickness or camber before the flaps can be lowered into operative position.

It is still another object of the invention to have the system so designed and arranged that the flaps are automatically retracted before the wing may be reduced in thickness.

It is still another object of my invention to provide an expansible wing or a wing having a variable shaped airfoil that maintains a clean and streamlined airfoil shape regardless of whether it is operated to its maximum or minimum thickness, always maintains a very favorable lift-drag ratio, and is therefore an efficient airfoil at all points of its expansion.

It is another object of my invention to provide a flexible variable shaped airfoil having improved airflow and boundary layer characteristics and wherein the flexibility of the airfoil in effect increases the strength thereof since it permits the airfoil to flex or give when subjected to severe shocks such as when flying through turbulent air. When the airfoil is flying through turbulent air, the shocks imposed on the airfoil will cause certain portions thereof to temporarily arch or flex to form humps. However, the flow of air over the wing is such that it will permit these humps to quickly flex to their original positions or flatten out once the abnormal stresses are removed therefrom.

It is yet another object of my invention to provide a flexible wing having a variable airfoil wherein the wing structure is connected to shock absorbing and vibration dampening means to reduce the stresses in the wing and to prevent the wing from being overstressed.

It is another object of the invention to provide an aircraft wing whose cross-sectional shape or airfoil may be increased in thickness for landing and taking off whereby the center of lift of the airfoil moves forwardly thereby counteracting or balancing the effects of flaps which may cause the center of lift to move rearwardly.

It is still another object of the invention to provide an aircraft wing having flexible surfaces which are moved by power means whereby the pilot may flex the wing surfaces to remove any formations of ice or snow forming thereon. This increases the safety of the aircraft and insures a full load-carrying capacity throughout its flight.

This application is a continuation-in-part and improvement on the invention disclosed in my pending application 63,509, filed October 19, 1960, now Patent No. 3,076,623.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of my novel wing structure with parts thereof broken away;

FIGURE 2 is a bottom view of the wing shown in FIGURE 1 with portions broken away;

FIGURE 3 is an enlarged cross-sectional view taken substantially on the plane of line 3—3 in FIGURE 1;

FIGURE 4 is a view similar to FIGURE 3 but showing the wing in expanded position with the flaps down;

FIGURE 5 is a longitudinal cross-sectional view taken substantially on the plane of line 5—5 in FIGURE 3;

FIGURE 6 is a longitudinal vertical view taken substantially on the plane of line 6—6 in FIGURE 3;

FIGURE 7 is a vertical cross-sectional view taken substantially on the plane of line 7—7 in FIGURE 3;

FIGURE 8 is a diagrammatic view showing the power control system for controlling my novel wing;

FIGURE 9 is a perspective view illustrating my wing in its maximum lift position on a conventional aircraft;

FIGURE 10 is a vertical cross-sectional view taken transversely through a modified form of my invention; and FIGURE 11 is a view similar to FIGURES 3 and 4 illustrating another modified form of my invention.

With continuing reference to the drawings, wherein like reference numerals in the various views indicate identical parts, it can be seen that my improved airfoil or wing 10 includes a longitudinally extending forward spar 12 and a rear spar 14 parallel thereto together forming a rigid supporting frame for the wing. The spars 12 and 14 are enclosed and extend through a plurality of chordwise extending flexible ribs 16. The ribs 16 are each enclosed within and connected to a thin covering skin 18 composed of a flexible material such as aluminum alloy to form therewith an enclosing airfoil contour surface that is deformable throughout in a plane perpendicular to the spars. The ribs 16 preferably are all connected together by a plurality of spaced longitudinally extending stringers 20 of U-shaped cross section. As can be seen in FIGURES 3 and 4, the cross section of the wing 10 is of a conventional airfoil shape having a susbtantially flat bottom and a convex upper surface connected thereto by rounded leading edge 22 and a tapered trailing edge 24.

The upper and lower edges of each rib 16 are connected near their leading edges to a pair of toggle links 26 and 28 at 30 and 32 respectively. The inner ends of the toggle links are pivotally connected together by a pivot pin 34 which also pivotally connects the toggle links to an operating beam 36. The beam 36 is provided with a plurality of forwardly extending arms 38 which have bearing members 40 threaded on their forward ends, and these bearing members 40 are in turn pivotally connected to the pins 34 and toggle links.

Both the forward and rear spars 12 and 14 comprise conventional I-shaped members, and the forward spar 12 has a plurality of spaced bores therein which receive hydraulic cylinders 42 which extend through the bores and are welded to the spar 12. Each of the cylinders 42 have a conventional piston slidable therein and connected to a connecting rod 44 which extends through a seal in the forward end of the cylinder and in turn has its forward end connected to operating beam 36. Fluid pressure lines 142 and 114 are connected to the forward and rear ends of each cylinder 42 on each side of its piston.

The bottom surface of wing 10 is provided with a plurality of spaced longitudinally extending recesses 50 and 52 each having a cross-sectional shape of a conventional airfoil and similar to the cross-sectional shape of the wing itself. The ribs 16 each have curved portions 54 and 56 forming the recesses 50 and 52 and the skin 18 follows the contour of these curved portions as shown in FIGURES 3 and 4. The center of the curved portion 54 is provided with an ear 58 and the upper central portion of the rib 16 is provided with an ear 60. The two ears 58 and 60 are pivotally connected together by a link 62 and pivot pins 64.

Directly forward of each of the recesses 52 and 54, a plurality of chordwise extending slots 66 and 68 are provided in the bottom surface of the wing which communicate with the recesses. Normally, the recesses 50 and 52 are completely filled or occupied by surface control means in the form of longitudinally extending flaps 70 and 72 of conventional design and structure. The flaps 70 and 72 are each respectively connected to the wing structure by a pair of forwardly extending arms 74 and 76 which are pivotally connected at their forward ends to the wing structure by pivot pins 78 and 80. A hydraulic motor including a cylinder 82 and piston rod 84 is connected between each pair of arms 74 and 76. Each piston rod 84 is pivotally connected to an ear 86 on arm 74, and the cylinder 82 has a rearwardly extending lug 88 pivotally connected at 90 by a pivot pin to a forward portion of arm 76. The forward and rear ends of the cylinder 82 are connected to hydraulic lines 116 and 128.

Each of the ribs 16 are provided with generally Y-shaped yokes 96 each having a short leg 98 fixed to the curved portion 56 of the rib and a long leg 100 connected to the bottom surface of the wing at the trailing edge 24. The legs 98 and 100 converge together and are connected to a stem 102 which is pivotally connected by a pivot pin 104 to the rear end of a cantilevered support arm 106. The forward end of each support arm 106 has flanges which are connected to the spar 14 by means of rivets 108. As shown in FIGURES 4 and 7, the long leg 100 is of rectangular flat cross section and is slidably guided by a sleeve member 110 fixed to the upper half of the rib 16.

As shown in FIGURE 8, each of the hydraulic cylinders 42 and 82 is connected to a control valve 112 by means of conduits 114 and 116 respectively. The valve 112 is connected to a reservoir 118 by means of a pressure supply line 120, a pump 122 and an intake line 124. The valve is also connected to the reservoir by an exhaust line 126. The line 114 is connected to the rear end of the cylinder 82 by means of a passage or line 128 containing a pressure relief valve assembly 130. The valve assembly 130 includes a housing 132 with parallel passageways 134 and 136 therein. The passageway 134 is normally closed by spring-urged pressure relief valve 138, but opens at a predetermined pressure to permit fluid to flow from line 114 to line 128. The passage 136 contains a check valve 140 which permits fluid to flow freely only in the direction from the line 128 to line 114. The passage 116 is connected to the forward end of cylinder 42 by means of a line 142 which includes a pressure relief valve assembly 130' identical to the one previously described.

For normal cruising and high speed flight, the wing 10 is operated by the motors 42 to maintain it in a position of minimum thickness as shown in FIGURE 3. In this position, the toggle links 26 and 28 are buckled substantially and the link 62 is sloping rearwardly at a substantial angle whereby these links in these positions maintain the upper and lower surfaces of the wing relatively close to one another for decreasing the thickness of the wing. Also, the trailing edge 24' of the upper surface of the wing is directly adjacent the trailing edge 24 of the bottom portion of the wing so as to limit the ribs to their position of minimum camber. When it is desired to increase the thickness of the wing in order to obtain a greater lift therefrom, one of the crew members of the aircraft operates the control valve 112 by means of a pivoted handle 113 so as to connect the pressure line 120 to the line 114 and to connect the line 116 to the exhaust line 126. The pump 122 pumps fluid 119 from the reservoir 118 via filter 144 and line 124. The fluid pressure from pump 122 is conducted via lines 120, valve 112 and line 114 to the right end of cylinder 42 for urging the piston rod 44 out of the cylinder and toward the leading edge 22. Pressure relief valve 138 and check valve 140 in the valve assembly 130 in line 128 prevent fluid pressure from flowing to cylinder 82. As piston rod 44 moves outwardly or forwardly in relation to cylinder 42, the toggle links 26 and 28 are operated by beam 36 and arms 38 so that they move toward an aligned position as shown in FIGURE 4. Each pair of adjacent links 28 have their upper rear edges connected together by a horizontal plate 29 which serves as an abutment for the flat surfaces on the bottom rear edges of the links 26. When the links 26 and 28 are perfectly aligned as shown in FIGURE 4, the flat surfaces 27 abut the abutments 29 thereby positively preventing further movement of the toggle links to limit deformation of the ribs to a position of maximum camber. As the toggle links are being operated to their aligned positions, the pivot pins 30 and 32 are gradually being urged apart thereby expanding the thickness of the leading edge portion of the wing 10. Also, since the upper half of the wing is not positively connected to the spar 12 or 14, this portion is free to move relative to the rest of the wing structure. Therefore, as the toggle links 26 and 28 are being moved to the aligned position, at the same time, the upper portion of the wing is gradually being moved forwardly in relation to the lower part of the wing thereby permitting the upper trailing edge 24' to move forwardly and upwardly in relation to the lower trailing edge 24 as shown in FIGURE 4. The space between these two trailing edges is substantially closed by a plate 18'. As the upper portion of the wing moves forwardly, the rear thereof is guided and prevented from moving vertically relative to the remainder of the wing by the sleeve 110 sliding on the long leg 100. As the upper portion of the wing moves forwardly, it also rotates the link 62 in a counterclockwise direction as viewed in FIGURE 4 about the pivot pin 64 thereby urging the upper and lower portions of the wing at the center thereof apart for greatly increasing the thickness of the central portion of the wing. When the wing in order to control camber of the airfoil has been fully expanded as illustrated in FIGURE 4, the piston 43 abuts the forward end of cylinder 42 thereby positively preventing any further forward movement of the piston and its rod 44. This causes the pressure to rapidly increase in line 114 thereby causing pressure relief valve 138 to open and admit fluid pressure to line 128 and the rear end of cylinder 82. If the crew member so desires, he may then close valve 112 for preventing fluid pressure to flow to the right end of cylinder 82. However, if the valve 112 is left in its original position, fluid pressure flows into the right end of cylinder 82 thereby urging the piston rod 84 forwardly and the cylinder 82 rearwardly. The forward movement of rod 84 pivots flap arm 74 and flap 70 downwardly, and the rearward movement of cylinder 82 pivots flap arm 76 downwardly along with its attached flap 72. The flaps continue to move downwardly until the arms 74 abut against the forward walls of slots 66 and 68 and the piston 83 abuts against the forward wall of cylinder 82. It is to be particularly noted that the rear flap 72 moves to a greater angle than the forward flap 70 and the rear flap is slightly larger than the forward flap. Also, the space between the leading edge of the forward flap and the wing is greater than the space between the rear flap and the bottom of the wing. These features thereby insure that adequate air may flow past the forward flap and react on the rear flap without reducing the efficiency thereof.

When the pistons 43 and 83 are moving forwardly, it is to be noted that fluid is flowing from the forward ends of cylinders 42 and 82 back to reservoir 118 by means of line 142 and the passage 136 in valve 130' connected to this line.

The piston rods 44 and 84 may be hydraulically locked in any position merely by closing valve 112. To move the wing and flaps from the FIGURE 4 position of maximum camber to the FIGURE 3 position of maximum chordwise length, the valve 112 is operated by handle 113 so as to connect line 120 with line 116 and so as to connect line 114 with line 126. The fluid pressure from pump 122 then flows through line 120, valve 112 and line 116 to the forward end of cylinder 82 thereby urging piston 83 and piston rod 84 rearwardly for retracting flaps 70 and 72. Once the flaps are fully retracted and the piston 83 abuts the rear end of cylinder 82, the pressure builds up in line 116 thereby forcing open pressure relief valve 138 in valve assembly 130' and admitting fluid to the forward end of cylinder 42 for retracting piston 43 and thereby causing wing 10 to move to its position of minimum thickness. During this phase of the operation, fluid is returning to reservoir 18 from cylinder 42 via conduit 114, valve 112 and conduit 126. At the same time, fluid is moving from the forward end of cylinder 82 by means of conduit 128, passageway 136, line 114, valve 112 and conduit 126.

A spring 146 is tensioned between ear 60 and spar 14 for normally urging the upper surface of the wing toward the lower surface.

While the flaps 70 and 72 have been disclosed as being operated by the same motor, it is apparent that separate motors could be provided for each flap. The flap 70 is provided with a recess 71 for receiving piston rod 84 when the flap is retracted.

As shown in FIGURE 1, the skin of the wing may terminate in end slots 148 and 150 at the root and tips of the wing for permitting free and unobstructed movement of the skin when the wing is flexed. The tip portion 152 may be of conventional rigid construction and be provided with an aileron 154. The slots 148 and 150 may be covered with flexible material such as plastic or rubber, or be provided with fences or flanges 151 and 153.

FIGURE 10 illustrates a flap design similar to that in FIGURE 4 that is mounted on a conventional rigid wing 10'. This wing includes longitudinal spars 156 and 158, airfoil shaped ribs 160 and a skin 162. The wing is also provided with recesses 50' and 52' for receiving the flaps 70' and 72'. The flaps 70' and 72' are pivotally connected to the wing by means of bell crank arms 74' and 76' pivotally connected at their apices to the wing by means of pivot pins 164 and 166. A hydraulic cylinder 168 is connected to the wing by means of motor mounts 170. The cylinder 168 contains two opposing pistons each connected to a piston rod 172 which is in turn pivotally and slidably connected to the upper ends of the bell cranks 74' and 76' by means of pivot pins 176 and 178 extending through yokes in the ends of the rods and through slots 180 and 182 in the upper ends of the bell cranks.

Fluid pressure lines 128' and 116' are connected to each end of cylinder 168 for operating piston 173 and the connecting rod 172 fixed to the piston forwardly and rearwardly. The lines 128' and 116' may be selectively and alternately connected to a pressure source and exhaust conduit for lowering or raising the flaps by a conventional valve means, not shown.

FIGURE 11 shows a third form of my invention comprising a flexible wing 10''. This wing is similar in many details to the wing shown in FIGURES 3 and 4, and for purposes of simplicity of explanation, like parts in this figure are given the same reference numerals as are the identical parts in FIGURES 3 and 4. Similar parts are indicated with a prime. The primary difference between the species shown in FIGURE 11 and that shown in FIGURES 3 and 4, is that in FIGURES 3 and 4, the wing operating cylinder 42 is mounted on the forward spar and operatively connected to the toggle links 26 and 28, while in FIGURE 11, the wing operating cylinder 42' is fixed to the rear spar 14' and the piston rod 44' is pivotally connected to the yoke 96'. Toggle links 26 and 28 are pivotally connected together and to the support arm 38' by means of a pivot pin 34. The arm 38' is secured to the spar 12' by means of rivets 168. A coil spring 146' is tensioned between ears 60 and 61 on the rib 16' for urging the upper and lower surfaces of the wing together. The forward and rear ends of the cylinder 42' are connected to conduits 114 and 142 respectively, and these conduits may be connected to a source of fluid pressure and a reservoir by a conventional selector valve for alternatively applying and exhausting fluid pressure from opposite ends of the cylinder 42' for expanding and contracting the wing 10''. It is readily apparent that the form shown in FIGURE 11 could be supplied with flaps as illustrated in FIGURES 3 and 4, in which case the lines 114 and 142 of the cylinder 42' would be connected to the system illustrated in FIGURE 8.

When fluid pressure is supplied to the line 114, the piston rod 44' is urged rearwardly and this in turn urges the lower half of the wing rearwardly in relation to the spars by means of the yoke 96' which has its legs 98' fixed to the lower rear end of rib 16'. As the bottom portion of the wing moves rearwardly, the toggle link pivots 30 and 32' are also moved rearwardly thereby straightening out the toggle links for expanding the leading edge 22. Once the toggle links have become aligned, they are prevented from further pivotal movement by abutment 29 and the arm 38′ and spar 12′ prevent both pivot points 30 and 32 from moving rearwardly. Further rearward movement of the rod 44′ moves the lower half of rib 16′ rearwardly thereby causing toggle arms 26 and 28 to pivot counterclockwise as a unit about pivot point 34, causing the bottom portion of link 62′ to move rearwardly thereby spreading the upper and lower middle portions of the wing, and further causing the entire wing or substantially the entire wing to hump whereby its bottom surface becomes concave and its upper surface becomes more convex. This is caused by the yoke 96′ tending to rotate about the lower end of short leg 98′ and the toggle links 26 and 28 rotating counterclockwise as viewed in FIGURE 11 about pivot point 34. Of course this humping of the wing further increases the lift and drag thereof for providing slower landings and take-offs. In a like manner, it can be seen that the wing 10 shown in FIGURES 3 and 4 would also tend to hump since it has substantially the same stresses imposed thereon by the motor 42 as the motor 42′ imposes on the wing 10″.

Due to the flexibility of the wings having the variable shaped airfoils, they are free to flex to instantly conform to varying air forces acting on the wing surfaces such as gusts thus lessening the possibility of an inadvertent stall while landing or taking off. Accordingly, the power operated facilities provided for selectively varying the airfoil shape are hydraulic so as to offer the yieldability necessary to permit the instantaneous response to the varyin air forces.

It is to be noted that both wings 10 and 10″ are floating, i.e., they may move into a chordwise direction within a limited range in relation to their supporting spars 12 and 14 or 12′ and 14′. Springs, not shown, may be connected between the spars and wings to maintain them in a desired position.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A wing comprising longitudinally extending spar means extending through and operatively connected to a plurality of spaced flexible ribs variably deformable throughout in a plane transverse to said spar means, each of said ribs including flexible upper and lower portions joined at their leading edges, separate ends at the trailing edge thereof movable relative to one another, connecting means preventing substantial separation between said ends while permitting relative movement therebetween in a direction generally parallel to the chord of the rib for chord-wise deformation, expansion means displaceably mounted within said rib and connected to the upper and lower portions thereof operable to change camber spacing between the upper and lower portions, first power means operatively connected to said expansion means, dual flaps operatively connected in chordwise spaced relationship to the lower portions of the ribs and second power means operatively connected to said flaps.

2. A wing comprising longitudinally extending spar means extending through and operatively connected to a plurality of spaced flexible ribs variably deformable throughout in a plane transverse to said spar means, each of said ribs including flexible upper and lower portions joined at their leading edges, separate ends at the trailing edge thereof movable relative to one another, connecting means preventing substantial separation between said ends while permitting relative movement therebetween in a direction generally parallel to the chord of the rib for chord-wise deformation, expansion means displaceably mounted within said rib and connected to the upper and lower portions thereof operable to change camber spacing therebetween, first power means operatively connected to said expansion means, a first recess in the bottom of said wing adjacent the trailing edge thereof, a second recess in the bottom of said wing forward of said first recess, first and second flaps respectively in said first and second recesses, means movably connecting said flaps to said ribs, second power means connected to said flaps for retracting and extending same.

3. A wing as defined in claim 2 wherein said flaps are pivotally connected in spaced relation to their leading edges to said wing.

4. A wing as defined in claim 3 wherein the forward flap when fully extended is spaced by support means a greater distance from the wing than the rear flap.

5. A wing as defined in claim 4 wherein the rear flap moves to a greater angle relative to said wing than the forward flap.

6. A device as defined in claim 2 wherein said first and second power means comprise respectively first and second hydraulic motors connected to a source of pressure by a single control valve, first means connected between said hydraulic motors to prevent operation of the second motor until said wing has been substantially expanded.

7. A device as defined in claim 2 wherein said first and second power means comprise respectively first and second hydraulic motors connected to a source of pressure by a single control valve, first means connected between said hydraulic motors to prevent operation of the second motor until said wing has been substantially expanded, second means connected between said motors to prevent operation of the first motor to contract said wing until said second motor has retracted said flap.

8. A device as defined in claim 7 wherein said first and second means comprise pressure relief valves.

9. A device as defined in claim 8 wherein said pressure relief valves have bypasses controlled by one way valves.

10. An aircraft wing having a top and a bottom, a first recess in the bottom of said wing adjacent the trailing edge thereof, a second recess in the bottom of said wing forward of said first recess, first and second flaps respectively in said first and second recesses, means movably connecting said flaps in spaced relation to the bottom of said wing when extended, and power means connected to said flaps for retracting and extending same.

11. A device as defined in claim 10 wherein said flaps are pivotally connected to said wing by forwardly extending arms fixed to the flaps and pivoted to said wing, said power means including a hydraulic expansible motor connected between said arms for simultaneous retraction and extension of the flaps.

12. An airfoil assembly comprising, rigid supporting frame means, contour surface means spaced throughout in enclosing relation to the frame means and deformable throughout for continuous variation in airfoil shape within limits to control aerodynamic lift, yieldable displacing means mounted by the frame means and operatively connected to the contour surface means to regulate said variation in airfoil shape in response to both aerodynamic forces applied to the airfoil assembly and selective control imposed on the yieldable means, whereby boundary layer airflow over the airfoil assembly may be regulated in accordance with the aerodynamic forces imposed thereon and displaceable control surface means operatively connected to said contour surface means for increasing lift in response to deformation of the contour surface means to a limit shape.

13. An airfoil assembly comprising, rigid supporting frame means, deformable contour surface means spaced throughout in enclosing relation to the frame means for continuous variation in airfoil shape thereof to control aerodynamic lift, yieldable displacing means mounted by the frame means and operatively connected to the contour surface means to effect said variation in airfoil shape in response to both aerodynamic forces applied to the airfoil assembly and selective control imposed on the yieldable means, whereby boundary layer airflow over the airfoil assembly may be regulated in accordance with the aerodynamic forces imposed thereon, said yieldable displacing means including means for limiting said variation in airfoil shape to a maximum camber position of the contour surface means relative to the frame means and means for limiting said variation in airfoil shape to a minimum camber position of the contour surface means relative to the frame means and selectively controlled power operated means mounted on the frame means and operatively connected to the contour surface means adjacent leading and trailing edges thereof for relative displacement of spaced portions of the contour surface means on opposite sides of the leading and trailing edges respectively, and biased means operatively connected to the contour surface means for varying the camber thereof in response to said relative displacement producing a variation in chordwise length, and flap means movably mounted by the contour surface means and operatively connected to the yieldable displacing means for extension from the airfoil assembly in response to operation of said power operated means only when the contour surface means is in said position of maximum camber.

14. The combination of claim 13, wherein said flap means includes a pair of spaced flaps simultaneously extended by different angular amounts, said flaps having leading airfoil edges spaced by different amounts from the contour surface means when the flaps are in extended positions relative to the contour surface means.

15. An airfoil assembly comprising, rigid supporting frame means, deformable contour surface means spaced throughout in enclosing relation to the frame means for continuous variation in airfoil shape thereof to control aerodynamic lift, and yieldable displacing means mounted by the frame means and operatively connected to the contour surface means to effect said variation in airfoil shape in response to both aerodynamic forces applied to the airfoil assembly and selective control imposed on the yieldable means, whereby boundary layer airflow over the airfoil assembly may be regulated in accordance with the aerodynamic forces imposed thereon, said yieldable displacing means including, means for limiting said variation in airfoil shape to a maximum camber position of the contour surface means relative to the frame means, and flap means movably mounted by the contour surface means and operatively connected to the yieldable displacing means for extension from the airfoil assembly in response to said selective control only when the contour surface means is in said position of maximum camber.

16. An airfoil assembly comprising, rigid supporting frame means, deformable contour surface means spaced throughout in enclosing relation to the frame means for continuous variation in airfoil shape thereof to control aerodynamic lift, and yieldable displacing means mounted by the frame means and operatively connected to the contour surface means to effect said variation in airfoil shape in response to both aerodynamic forces applied to the airfoil assembly and selective control imposed on the yieldable means, whereby boundary layer airflow over the airfoil assembly may be regulated in accordance with the aerodynamic forces imposed thereon, said yieldable displacing means including, selectively controlled power operated means mounted on the frame means and operatively connected to the contour surface means adjacent leading and trailing edges thereof for relative displacement of spaced portions of the contour surface means on opposite sides of the leading and trailing edges respectively, and biased means operatively connected to the contour surface means for varying the camber thereof in response to said relative displacement producing a variation in chord-wise length.

17. An airfoil assembly comprising, rigid supporting frame means, deformable contour surface means disposed in enclosing relation to the frame means for continuous variation in air foil shape thereof to control aerodynamic lift, and yieldable displacing means mounted by the frame means and operatively connected to the contour surface means to effect said variation in air foil shape in response to both aerodynamic forces applied to the airfoil assembly and selective control imposed on the yieldable means, whereby boundary layer airflow over the airfoil assembly may be regulated in accordance with the aerodynamic forces imposed thereon, and flap means movably mounted by the contour surface means and operatively connected to the yieldable displacing means for extension from the airfoil assembly in response to said selective control, said flap means including a pair of spaced flaps simultaneously extended by different angular amounts, said flaps having leading airfoil edges spaced by different amounts from the contour surface means when the flaps are in extended positions relative to the contour surface means.

18. An airfoil assembly comprising, supporting frame means, contour surface means operatively mounted by the frame means, selectively controlled power operated means mounted on the frame means, and flap means movably mounted by the contour surface means including, a pair of spaced flaps operatively connected to the power operated means for simultaneous extension by different angular amounts to extended positions, said flaps having leading airfoil edges spaced by different amounts from the contour surface means when the flaps are in said extended positions.

References Cited in the file of this patent

UNITED STATES PATENTS

| | | |
|---|---|---|
| 1,747,637 | Larsen | Feb. 18, 1930 |
| 2,147,360 | Zaparka | Feb. 14, 1939 |
| 2,364,006 | Smith | Nov. 28, 1944 |
| 2,650,047 | Carhart et al. | Aug. 25, 1953 |